(12) United States Patent
Mecham et al.

(10) Patent No.: US 8,567,082 B2
(45) Date of Patent: Oct. 29, 2013

(54) SLEW BEARING SYSTEM

(75) Inventors: Cory Mecham, Collierville, TN (US); Jeff Craig, New Market, AL (US); Jeff Blankenship, Chapin, SC (US); Randall J. McNeil, Concord, OH (US)

(73) Assignee: Nucor Corporation, Charlotte, NC (US)

( * ) Notice: Subject to any disclaimer, the term of this patent is extended or adjusted under 35 U.S.C. 154(b) by 0 days.

(21) Appl. No.: 13/215,569

(22) Filed: Aug. 23, 2011

(65) Prior Publication Data
US 2012/0227462 A1 Sep. 13, 2012

Related U.S. Application Data

(62) Division of application No. 12/164,345, filed on Jun. 30, 2008, now Pat. No. 8,002,472.

(51) Int. Cl.
*G01B 5/00* (2006.01)
(52) U.S. Cl.
USPC ............................................... 33/517; 33/783
(58) Field of Classification Search
USPC ............ 33/517, 710, 711, 783; 73/7; 384/448
See application file for complete search history.

(56) References Cited

U.S. PATENT DOCUMENTS

| | | | |
|---|---|---|---|
| 3,679,277 A | 7/1972 | Dohmen | |
| 4,237,613 A * | 12/1980 | Slough et al. | 33/517 |
| 4,509,364 A * | 4/1985 | Schutz et al. | 73/7 |
| 4,584,865 A * | 4/1986 | Hutchins | 73/7 |
| 4,906,113 A | 3/1990 | Sague | |
| 5,074,677 A | 12/1991 | Andree et al. | |
| 5,150,975 A | 9/1992 | Major et al. | |
| 5,288,154 A | 2/1994 | Jost | |
| 6,119,504 A | 9/2000 | Claus | |
| 6,145,626 A | 11/2000 | Niemczura, Sr. et al. | |
| 6,257,078 B1 * | 7/2001 | Vencill | 33/517 |
| 6,357,921 B1 | 3/2002 | Dittenhofer | |
| 7,304,471 B2 * | 12/2007 | Koike et al. | 384/448 |
| 2009/0324151 A1 * | 12/2009 | Craig et al. | 384/448 |
| 2012/0134612 A1 * | 5/2012 | Snelick et al. | 384/448 |

FOREIGN PATENT DOCUMENTS

| | | |
|---|---|---|
| DE | 37 23 961 A1 | 2/1989 |
| DE | 203 16 544 U1 | 4/2005 |
| DE | 10 2008 046 357 A1 | 3/2010 |
| GB | 2 269 638 A | 2/1994 |

OTHER PUBLICATIONS

Canadian Office Action dated Oct. 22, 2012 for Application No. 2,729,361.

(Continued)

*Primary Examiner* — G. Bradley Bennett
(74) *Attorney, Agent, or Firm* — Moore & Van Allen, PLLC; Jeffrey R. Gray

(57) ABSTRACT

A method of monitoring wear of a slew bearing system includes steps of assembling a slew bearing system having a first bearing ring and a second bearing ring concentrically positioned relative to each other forming at least upper and lower raceways, a plurality of bearing rollers positioned in each raceway between the first bearing ring and the second bearing ring, and an index system having a first reference connected with the first bearing ring and positioned relative to a second reference on the second bearing ring to provide a measurable distance between the first reference and the second reference, where the measurable distance changes with wear of the slew bearing system; and monitoring a change in the measurable distance between the first reference and the second reference to monitor wear of the slew bearing system.

20 Claims, 9 Drawing Sheets

(56) References Cited

OTHER PUBLICATIONS

European Examination Report dated Jan. 8, 2013 for Application No. 11 000 947.9.
Search Report for Application No. 11000947.9 dated Apr. 2, 2012.
Search Report for Application No. 09774274.6 dated Mar. 27, 2012.
Patent Examination Report for Australian Patent Application No. 2012203052 dated Apr. 30, 2013.
Office Action issued for Chinese Patent Application No. 200980131768.X dated Apr. 17, 2013.

* cited by examiner

_US 8,567,082 B2_

SLEW BEARING SYSTEM

This application is a divisional application of U.S. patent application Ser. No. 12/164,345, filed Jun. 30, 2008.

BACKGROUND AND SUMMARY OF THE DISCLOSURE

The present invention is related to bearing systems, and more particularly, to slew bearing systems.

Slew bearings are large thrust bearings common to heavy loads. Slew bearings have in the past been used in applications such as steel mills and other heavy machinery. In many instances, the slew bearing is an integral and critical component of a larger system.

Slew bearings are often installed at the base of equipment to enable rotation of a supported structure. In these installations, it has often been difficult to access directly the slew bearings for inspection, maintenance, and repair. Accessing the slew bearings often required at least some disassembly of a larger system, resulting in lost productivity and higher maintenance costs. Additionally, the difficulty in accessing the slew bearings for inspections increases the likelihood of unexpected failure. Because slew bearings are large, expensive, and require long lead times for replacement, these unexpected failures may substantially impact the overall productivity of systems utilizing slew bearings.

A slew bearing system in the past generally included roller bearings positioned between concentric rings. These prior slew bearing systems typically relied upon grease as a lubricant. The grease was channeled through ports into the slew bearing to lubricate the roller bearings and the raceways of the bearing rings. In one example, an automated lubrication system injected grease at regular intervals into the slew bearing.

Prior slew bearing systems employing grease lubrication had several drawbacks. When grease was injected into the slew bearing system, excess grease within the slew bearing was allowed to escape. The exiting grease collecting around the slew bearing collected dust and created a risk of fire especially in high temperature environments such as steel mills. The grease may not adequately reach all of the bearing elements within the slew bearing system leading to wear and other damage and premature failure of slew bearing systems. Also, grease is generally pressurized during injection into the slew bearing, but resides in the bearing under low pressure and may harden. Hardened grease within the slew bearing has further prevented adequate distribution of lubricant to all of the bearing elements leading to wear and damage in the bearing and premature failure of the bearing. In addition, the input ports where the grease is delivered to the bearing system may become blocked and prevent the grease from entering the slew bearing.

Furthermore, even when properly lubricated, metal particles may be produced within slew bearings due to wear between the roller bearings and the raceways. Slew bearings have also often been employed in operating environments where external contaminants may enter the slew bearing. Slew bearings even with proper grease lubricant have been damaged internally by these various forms of contamination. Grease lubricants have tended to hold metal particles and other contaminants, resulting in those contaminants being drawn into contact with the bearing elements within the slew bearing system. Contamination within the bearing has led to increased friction diminishing the effectiveness of the slew bearing, as well as mechanical damage such as spalling and brinneling in the bearing. Grease lubricants have not typically been filtered in service and therefore contaminants have tended to collect over time increasing the potential for damage and resulting in additional failures of slew bearing systems.

Another drawback to grease lubrication has been increased heat within the slew bearings. Effective grease lubrication often required filling the interstices and internal volume of the slew bearing system. The grease typically did not flow through the slew bearing system during normal operation. These factors often lead to the slew bearing system running hotter than desired resulting in increased metal fatigue and more rapid failure of the slew bearing systems.

Grease lubricants have also led to increased clean up costs. The grease used in prior systems may be delivered to the slew bearing periodically resulting in used grease being forced out of the slew bearing system. The used grease tended to build up and maintenance was required to remove the excess grease. This clean up added to maintenance costs.

The grease lubricants used in prior slew bearing systems have also been expensive. Many applications required specialized grease to accommodate for the temperature and operating environment where the slew bearing system was employed. Also prior slew bearing systems have not been able to recycle the used grease resulting in increased operating costs for the slew bearing system. The disposal of used grease has also been costly and often required special disposal procedures to comply with environmental regulations.

The drawbacks of grease lubrication limited the life expectancy of slew bearing systems. The life expectancy of slew bearing systems has typically been calculated based upon factors such as the required load carrying capability, the effectiveness of grease lubrication, and the operating temperatures. These problems associated with grease lubrication limited the projected life expectancy of slew bearing systems, as well as increased the risk of actual failures of the slew bearings. In some applications, replacement of slew bearings has been required at regular intervals, in some cases as frequently as every few months. Given the cost of the slew bearing systems and the difficulty of installation, regular replacement of the slew bearings substantially increased overall operating costs for the slew bearing systems and reduced the productivity of the equipment and systems utilizing slew bearings.

Other prior slew bearing systems have employed oil circulation lubrication. These systems have typically filled the slew bearing with circulating oil, which may or may not be filtered and recycled. Due to the size of slew bearings, slew bearings employing oil circulation lubrication have generally required large quantities of oil. In many instances, special oils have been required due to the operating environment of the slew bearing resulting in higher material costs. In any event, special procedures where often required to dispose of the used oil, further increasing the operating costs of these slew bearing systems. Excess oil within the slew bearing has impeded the movement of the roller bearings within the slew bearing system decreasing the effectiveness of the slew bearing. Another drawback of oil circulation lubrication has been increased heat with the slew bearing. As with grease lubrication, excess heat within the slew bearing system has resulted in increased metal wear and metal fatigue, and hastened the failure of the slew bearing systems.

In light of the drawbacks associated with these prior lubrication techniques, there continues to be a need for slew bearing lubrication systems that provide proper lubrication of the bearing elements while improving reliability, extending bearing life, and reducing operating costs.

A slew bearing system is presently disclosed that comprises a first bearing ring and a second bearing ring concentrically positioned relative to each other forming at least upper and lower raceways there between, a plurality of bearing rollers positioned in each raceway between the first bearing ring and the second bearing ring, a plurality of delivery nozzles capable of delivering an air and oil mixture into the raceways adjacent the upper raceway, passages capable of fluidly communicating the air and oil mixture through the raceways and collecting some oil from the mixture adjacent the lower raceway, seals capable of regulating air flow through the passages and inhibiting outflow of oil from the raceways, and at least one exit port capable of outward flow of air and oil from the raceways adjacent the lower raceway.

Also disclosed is a slew bearing system that comprises a first bearing ring and a second bearing ring concentrically positioned relative to each other forming at least upper and lower raceways there between, a plurality of bearing rollers positioned in each raceway between the first bearing ring and the second bearing ring, a plurality of delivery nozzles capable of delivering an air and oil mixture into the raceways adjacent the upper raceway, passages capable of fluidly communicating the air and oil mixture through the raceways and collecting some oil from the mixture adjacent the lower raceway, at least one exit port capable of outward flow of air and oil from the raceways adjacent the lower raceway, an upper seal positioned between the first bearing ring and the second bearing ring, a lower seal positioned adjacent the first bearing ring capable of preventing outflow of air and oil from the passages through the bearing rings, a seal ring positioned adjacent at least one surface of the second bearing ring, and an air pressure control valve positioned adjacent the seal ring capable of regulating air flow in the passages.

Also disclosed is a method of detecting wear of a slew bearing system that comprises assembling a slew bearing system that comprises a first bearing ring and a second bearing ring concentrically positioned relative to each other forming at least upper and lower raceways, a plurality of bearing rollers positioned in each raceway between the first bearing ring and the second bearing ring, and an index system having a first reference connected with the first bearing ring and positioned relative to a second reference on the second bearing ring to provide a measurable distance between the first reference and the second reference, where the measurable distance changes with wear of the slew bearing system; and monitoring a change in the measurable distance between the first reference and the second reference to monitor wear of the slew bearing system.

Also disclosed is an index system having the capability of detecting wear of a slew bearing system comprised of a first bearing ring and a second bearing ring concentrically positioned relative to each other forming at least upper and lower raceways, a plurality of bearing rollers positioned in each raceway between the first bearing ring and the second bearing ring, and a first reference connected with the first bearing ring and positioned relative to a second reference on the second bearing ring providing a measurable distance between the first reference and the second reference, where the measurable distance is capable of changing with wear of the slew bearing system.

BRIEF DESCRIPTION OF THE DRAWINGS

Presently contemplated embodiments of the slew bearing system are described below by reference to the following figures.

DETAILED DESCRIPTION OF THE DRAWINGS

Figure 1:
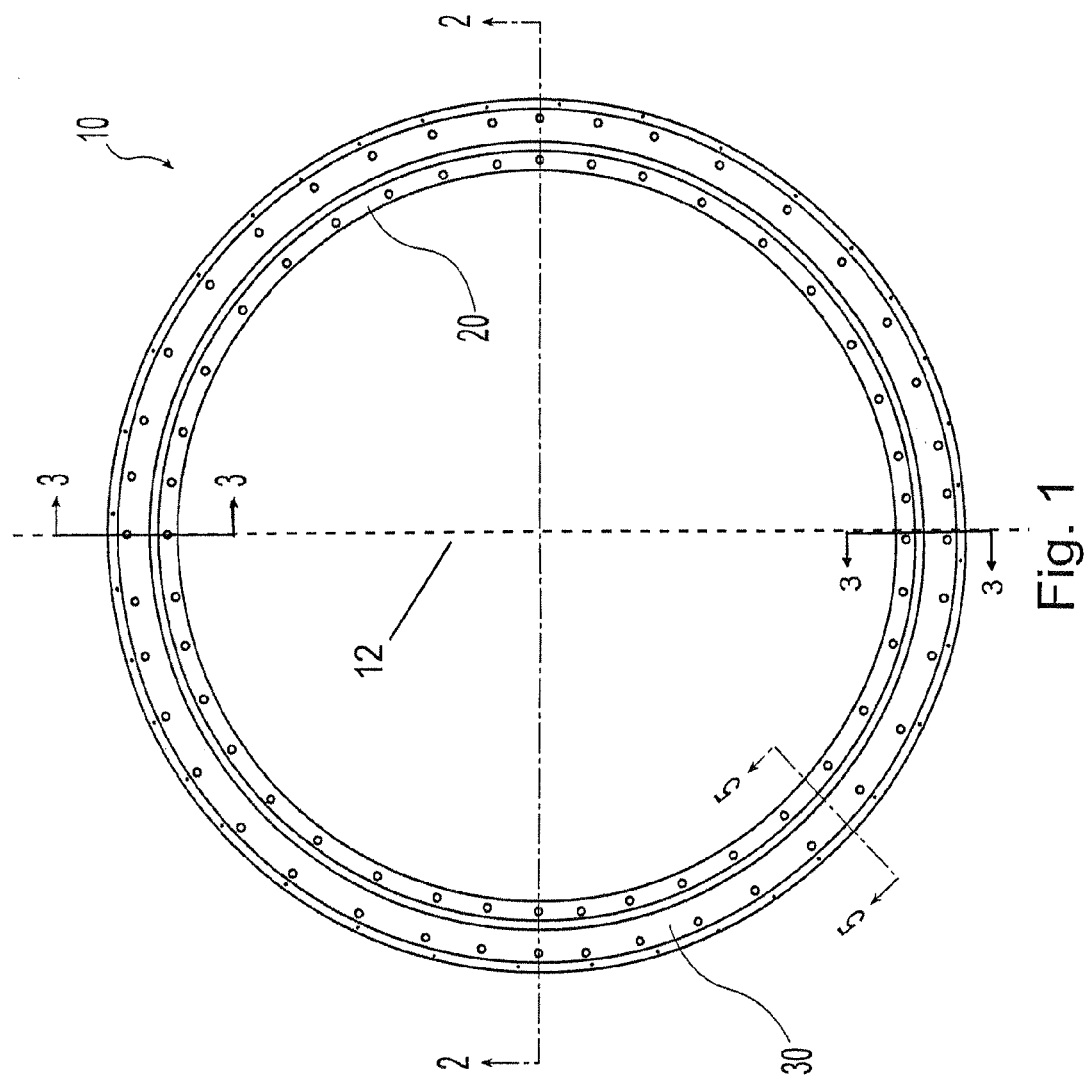
FIG. 1 is top view of a slew bearing system.
Figure 2:
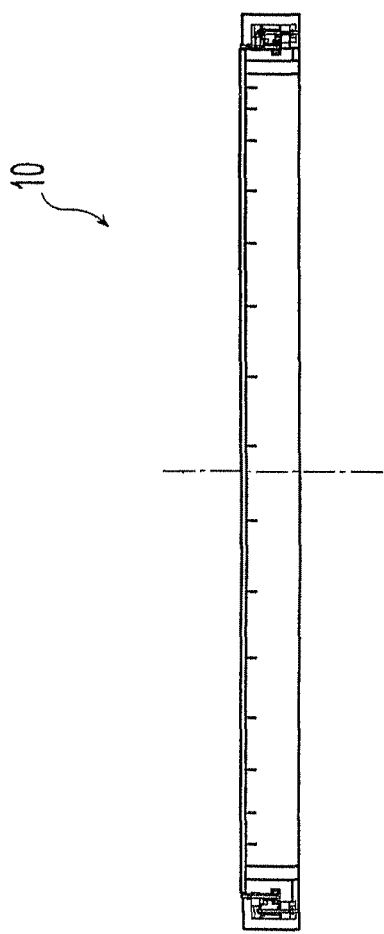
FIG. 2 is sectional view of the slew bearing system of FIG. 1 along section line 2.

Referring generally to FIGS. 1 through 9, a slew bearing system 10 is disclosed with air and oil lubrication. The slew bearing system 10 may be suitable for use in various applications including high temperature applications such as steel mills with electrical arc furnaces. As shown in FIG. 1, the slew bearing system may comprise an first bearing ring 20 and an second bearing ring 30 concentrically positioned relative to the first bearing ring. The first bearing ring 20 and the second bearing ring 30 form raceways there between, and a plurality of bearing rollers may be positioned in each raceway between the first bearing ring and the second bearing ring. The bearing rollers are capable of supporting the load carried by the slew bearing. The slew bearing system 10 also has a plurality of delivery nozzles 70, seals, and exits ports 80 arranged as described below.

Figure 3:
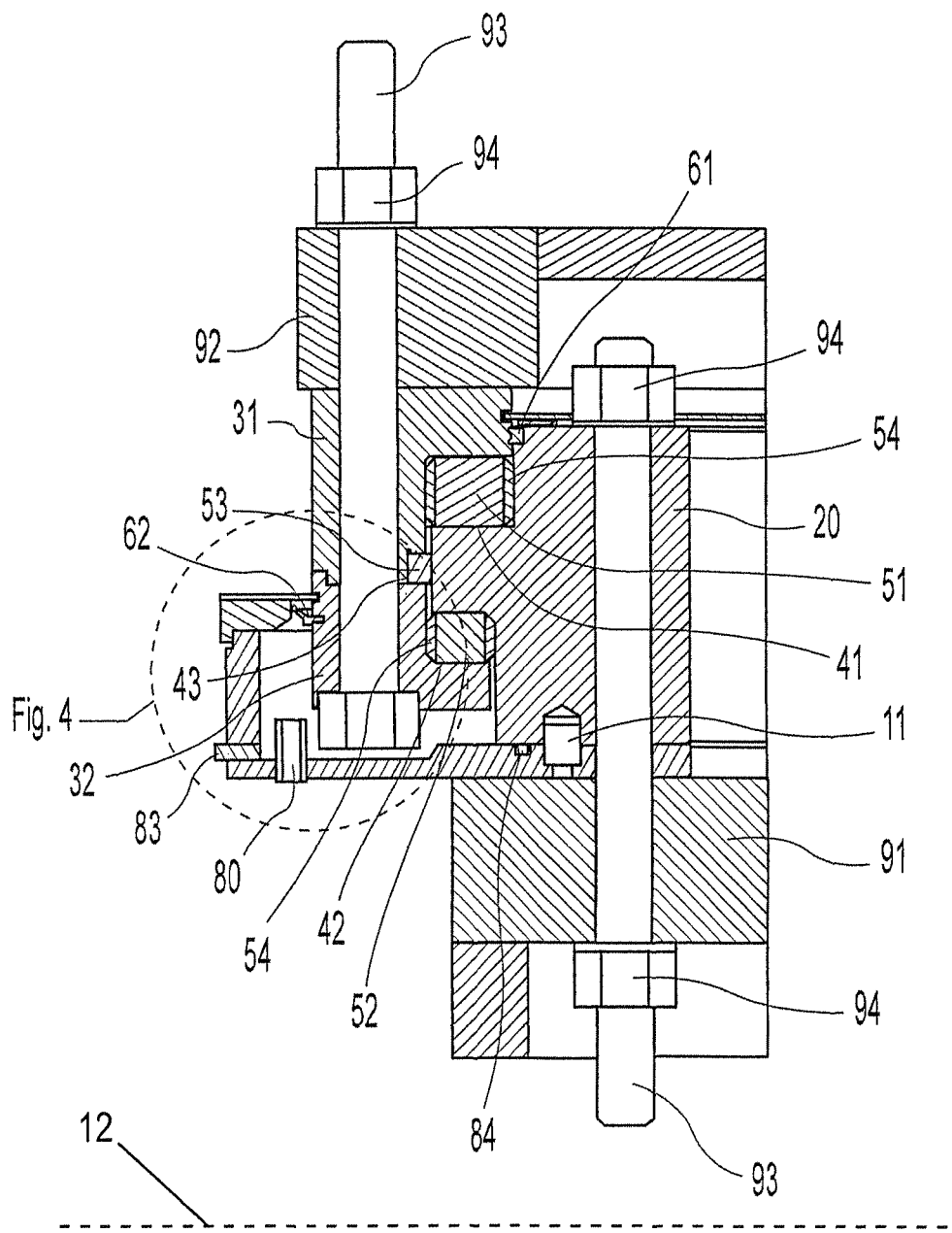
FIG. 3 is sectional view of the slew bearing system of FIG. 1 along section line 3.

The first bearing ring 20 and the second bearing ring 30 are generally fastened to a surrounding system supported by the slew bearing. As shown in FIG. 3 for example, the first bearing ring may be fastened to a support base 91, while the second bearing ring 30 is fastened to a turret base frame 92. Alternatively, the first bearing ring 20 may be fastened to a turret base frame 92, while the second bearing ring is fastened to a support base 91. In any case, the slew bearing system 10 may typically enable the turret base frame 92 to rotate relative to the support base 91.

Figure 7:
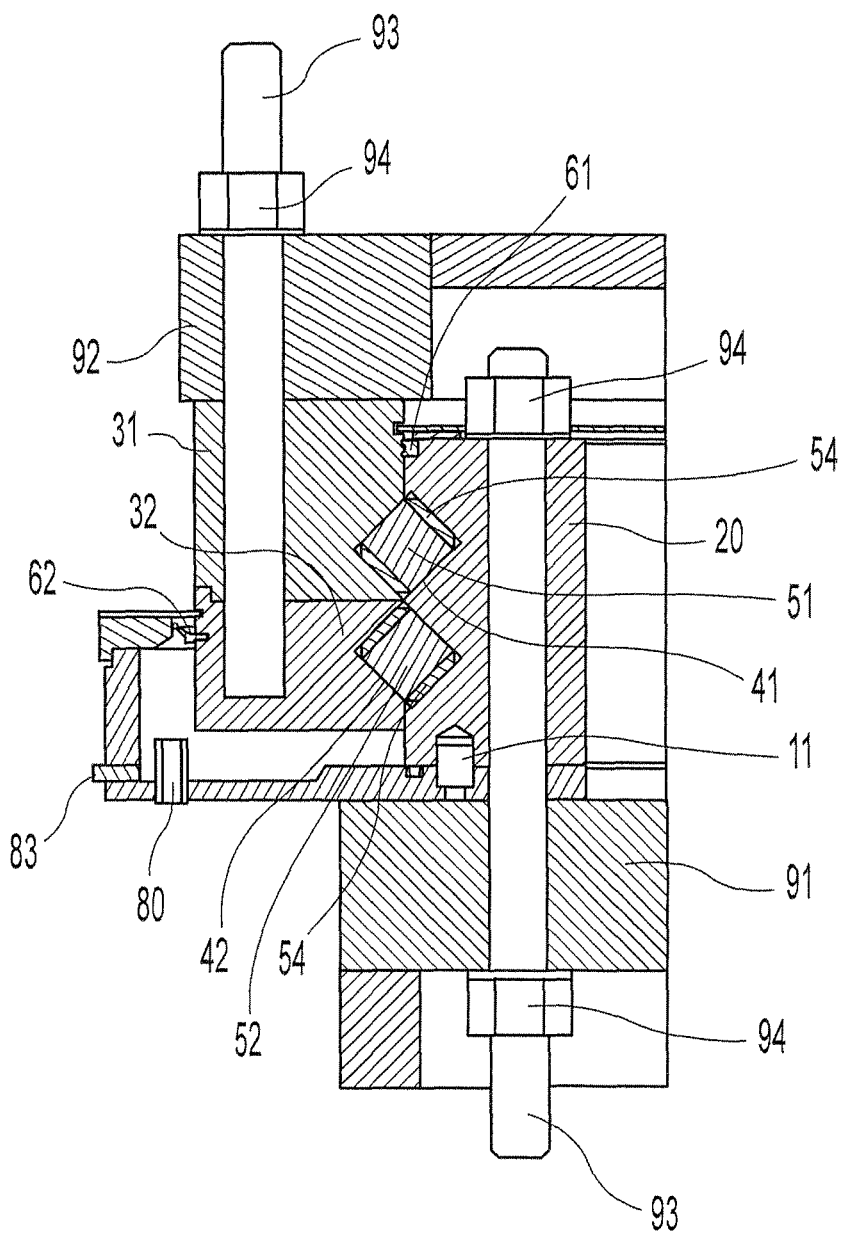
FIG. 7 is a sectional view of another slew bearing system.

The first bearing ring 20 and the second bearing ring 30 may be fastened to elements of the surrounding system by bolts 93 and nuts 94, as shown in FIG. 3. Alternatively, stud bolts may be used to fasten the bearing rings to the surrounding system. For example, the second bearing ring 30 may be fastened to a turret base frame 92 by a stud bolt 93, as shown in FIG. 7. The use of a stud bolt may simplify assembly and installation of the slew bearing system 10. In addition, attachment of the first bearing ring 20 and the second bearing ring 30 to the surrounding system by other appropriate mechanical devices or techniques are also contemplated.

As shown in FIG. 3, the second bearing ring 30 may be formed from two mating pieces, a second bearing ring first portion 31 and a second bearing ring second portion 32. The cross-section of the second bearing ring may be generally U-shaped and positioned around the first bearing ring 20. Alternatively, the cross-section of the first bearing ring 20 may be generally U-shaped and positioned around the second bearing ring 30. The first bearing ring 20 may also be formed from two mating pieces. Other configurations of the first bearing ring and second bearing ring are also contemplated. For example, as shown in FIG. 7, the first bearing ring 20 and the second bearing ring 30 may have generally V-shaped grooves with neither the first bearing ring nor the second bearing ring is positioned around the other.

The configuration of the slew bearing system 10 depicted in FIG. 3 in which the second bearing ring is formed of two mating pieces may facilitate assembly of the slew bearing system. By way of example, the slew bearing system 10 may generally be assembled by first positioning the second bearing ring second portion 32. Next, the lower bearing rollers 52 may be positioned, and the first bearing ring 20 placed into position concentric of the second bearing ring to contain the lower bearing rollers. Then the concentric bearing rollers 53 and upper bearing rollers 51 may be positioned, and the second bearing ring first portion 31 may be placed into position. Alternatively, if the first bearing ring 20 were formed from two mating pieces, the assembly process may proceed by first placing a first bearing ring second portion, positioning the lower bearing rollers, placing the second bearing ring, positioning the concentric and upper bearing rollers, and finally placing the first bearing ring first portion. Disassembly of the slew bearing system 10 may also be facilitated when the first bearing ring 20 or the second bearing ring 30 are formed with two or more mating pieces.

In operation, the slew bearing system 10 may need to be tilted. It may be desired to identify a tilt axis 12 of the slew bearing. In one embodiment, a slew bearing system 10 may also comprise an assembly index 11 capable of identifying a location along the circumference of the bearing rings. The assembly index 11 may be fastened along the circumference of the slew bearing at a known position relative to the tilt axis 12. The assembly index 11 may be used to identify the tilt axis 12 so that the slew bearing system 10 may be properly positioned prior to tilting.

Alternatively, the assembly index 11 may be used to identify a position along the circumference of the slew bearing system 10, which should not be subjected to increased loads often present on a tilt axis. Such a position may be present due to limitations in the processes used to heat treat large slew bearings. The assembly index 11 may be used to properly align the slew bearing system 10 and thereby avoid damaging the slew bearing system.

The second bearing ring 30 may be concentrically positioned relative to the first bearing ring 20 to form raceways 41 and 42 with the first bearing ring. The raceways may be channels or grooves between the first bearing ring 20 and the second bearing ring 30 in which the bearing rollers contact the first bearing ring and second bearing ring to carry the load of the bearing system. To reduce friction and improve the efficiency of the slew bearing system, the first bearing ring and second bearing ring may be manufactured to produce a low friction surface for the raceways. Additionally, the raceways may be hardened to reduce wear.

The configuration of the raceways may depend upon the design of the first bearing ring 20 and the second bearing ring 30. As shown in FIG. 7, at least an upper raceway 41 and a lower raceway 42 may be formed between the first bearing ring 20 and the second bearing ring 30. In this example, a plurality of bearing rollers may be positioned obliquely in the upper and lower raceways between the first bearing ring and the second bearing ring to carry the load of the bearing system. Alternatively, as shown in FIG. 3, three raceways may be formed including an upper raceway 41, a lower raceway 42, and a concentric raceway 43 to carry the load of the bearing system. Additionally, the slew bearing system may comprise passages capable of fluidly communicating air and oil through the raceways and collecting some oil adjacent the lower raceway.

A plurality of bearing rollers are positioned in each raceway between the first bearing ring 20 and the second bearing ring 30 to care the load of the bearing system. Upper bearing rollers 51 may be positioned in the upper raceway 41 and lower bearing rollers 52 may be positioned in the lower raceway 42. Additionally, concentric bearing rollers 53 may be positioned in the concentric raceway 43, as shown in FIG. 3. The expected load on the slew bearing system 10 may determine the number and the size of the bearing rollers employed. Typically, for greater bearing loads the greater the desired number and size of bearing rollers used.

Various types of bearing rollers may be used in the slew bearing system. By way of example, the bearing rollers may be cylindrical, ball, or tapered bearings. Alternatively, the bearing rollers may be profiled, such that the diameter of a bearing roller is greater in the middle of the bearing roller than at the ends of the bearing roller. Bearing rollers with such a profile may prevent stress concentration developing at the ends of the bearing rollers. Alternatively, the bearing rollers may be spherical bearings or ball bearings when suitable for the load on the slew bearing system.

The plurality of bearing rollers positioned within each raceway may be separated by bearing spacers 54. The bearing spacers 54 may prevent the bearing rollers from colliding within the raceways and may ensure the bearing rollers remain distributed throughout the circumference of the slew bearing. Additionally, the bearing spacers 54 may provide passages capable of fluidly communicating air and oil through the raceways to improve lubrication of the bearing rollers and raceways. Alternatively, some embodiments of the slew bearing system may employ a full complement of bearing rollers and may not utilize bearing spacers.

Figure 8A:
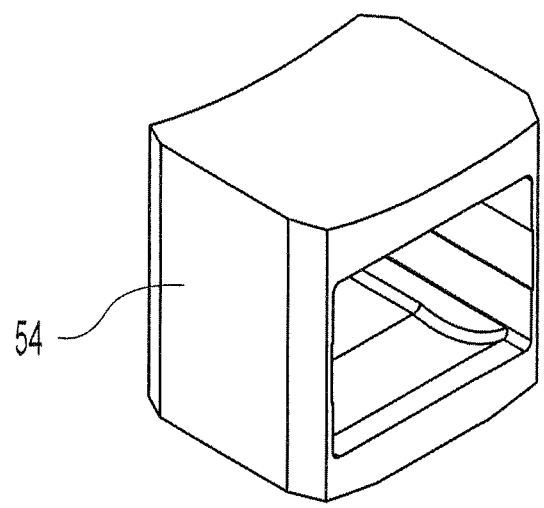
FIG. 8 is a perspective view of a bearing spacer.
Figure 8B:
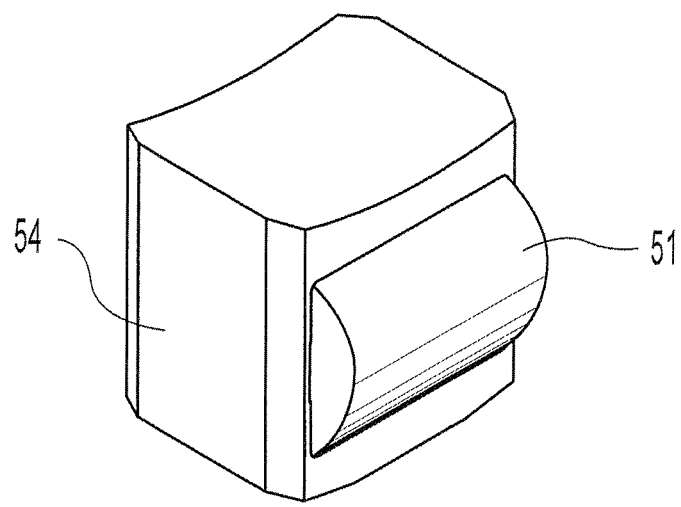

As shown in FIG. 8*a*, each bearing spacer 54 may be generally rectangular capable of being positioned around one bearing roller. In FIG. 8*b*, the bearing spacer 54 is illustrated positioned around an upper bearing roller 51. Other bearing spacer configurations are also contemplated for use with the slew bearing system. For example, a bearing spacer may be formed as a strip adapted to position multiple consecutive bearing rollers. In another example, a bearing spacer may be adapted to be positioned between consecutive bearing rollers.

The bearing spacers 54 may be formed from materials suitable for use in a selected application. For example, the bearing spacers may be formed from Delrin® for high temperature applications. Additionally, the bearing spacers may be formed from acetel resin. Alternatively, the bearing spacers may be formed from nylon or other plastic material. In another alternative, the bearing spacers may be formed from steel, bronze, or other appropriate metals. The material used to form the bearing spacer may be resistant to high temperatures and may be durable to maintain separation between the bearing rollers when heavy loads are applied to the slew bearing system.

The distribution of forces in the slew bearing may depend upon the configuration of the raceways and bearing rollers. In the three raceway configuration shown in FIG. 3, the upper bearing rollers 51 may withstand downward vertical thrust caused either by downward loads or by overturning or tipping forces applied to the slew bearing system 10. The concentric bearing rollers 53 may absorb radial forces. The lower bearing rollers 52 may withstand upward vertical thrusts caused by overturning or tipping forces applied to the slew bearing system 10. Other slew bearing system configurations may distribute these forces differently over two or more sets of bearing rollers positioned in two or more raceways. For example, in the two raceway configuration shown in FIG. 7, both the upper bearing rollers 51 and the lower bearing rollers 52 may withstand both radial and vertical forces applied to the slew bearing system.

In operation, the slew bearing system 10 may enable a turret base frame 92 to rotate relative to a support base 91 by enabling the second bearing ring 30 to rotate relative to the first bearing ring 20. The bearing rollers and raceways may reduce friction between the first bearing ring and the second bearing ring, and reduce the force required to rotate the slew bearing system 10. Lubrication within the slew bearing system 10 may further reduce friction between the first bearing ring and the second bearing ring, and inhibit damage to the bearing rollers and raceways.

In contrast with prior slew bearing systems utilizing grease lubrication, the slew bearing system 10 employs a pressurized air and oil system for lubrication. For example, the pressurized air and oil system for lubrication may be the air/oil lubrication system described in U.S. Pat. No. 6,145,626 to Niemczura, et. al. As shown in FIGS. 3 through 6, the slew bearing system 10 also comprises a plurality of delivery nozzles 70 and at least one exit port 80. The plurality of delivery nozzles 70 may be capable of delivering air and oil into the raceways adjacent the upper raceway, and the exit ports 80 may be capable of outward flow of air and oil from the raceways adjacent the lower raceway. The exit ports 80 may also be capable of maintaining a controlled amount of oil in the slew bearing system. Additionally, the slew bearing system 10 may comprise seals capable of regulating air flow through the passages and inhibiting outflow of oil from the raceways.

Figure 5:
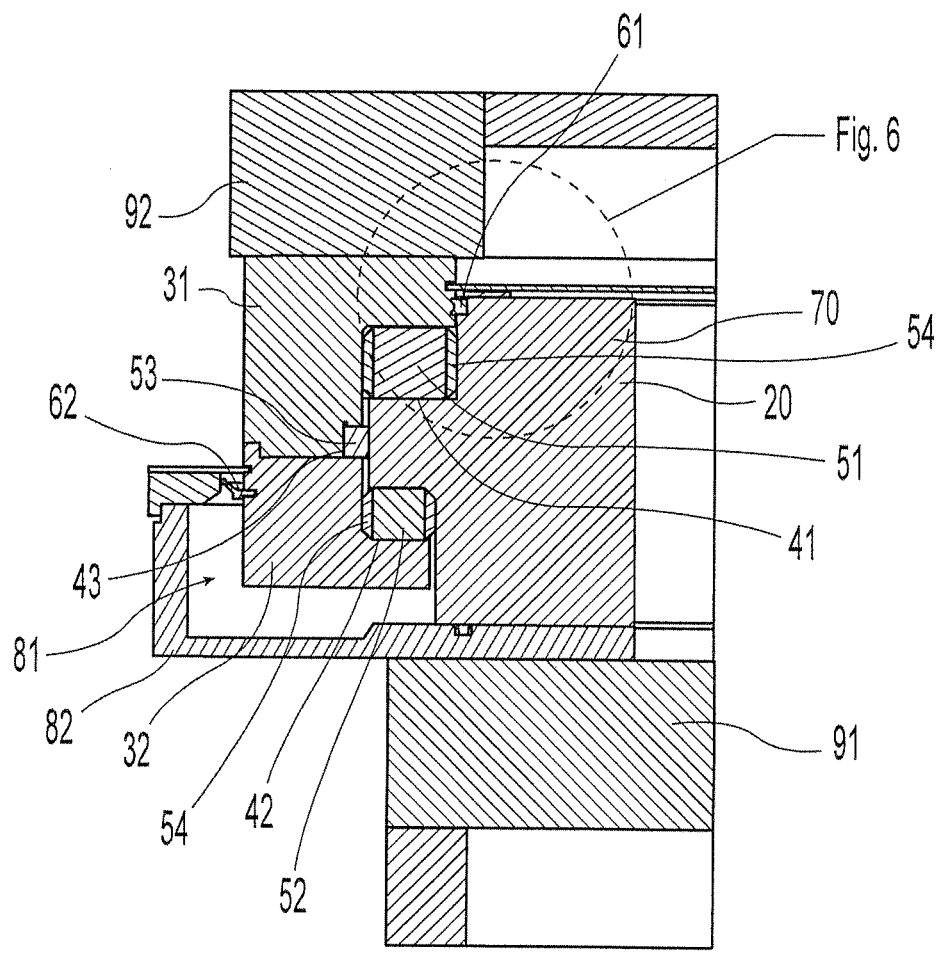
FIG. 5 is sectional view of the slew bearing system of FIG. 1 along section line 5.
Figure 6:
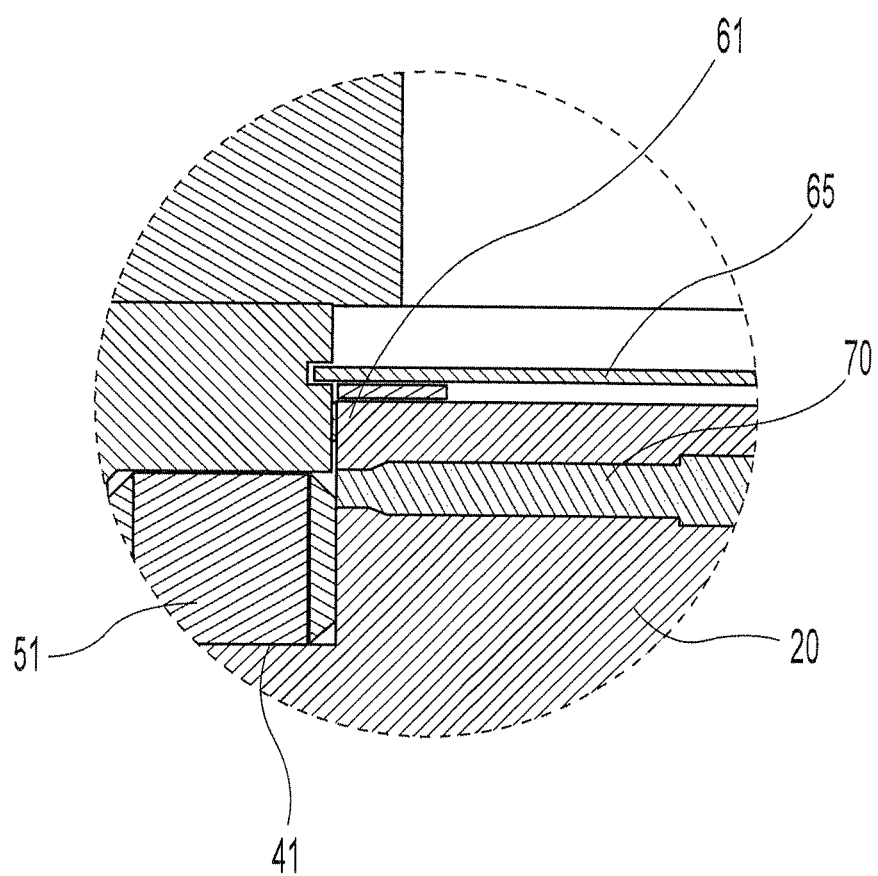
FIG. 6 is a detail view of the slew bearing system of FIG. 5.

The plurality of delivery nozzles 70 may be positioned at multiple locations. The delivery nozzles 70 may be positioned in the first bearing ring 20, as shown in FIG. 5. Alternatively, the delivery nozzles 70 may be positioned in the second bearing ring 30. As shown in FIG. 6, the delivery nozzles 70 may be positioned to deliver air and oil into the upper raceway 41. In another alternative, the delivery nozzles 70 may be positioned to deliver air and oil to multiple raceways in the slew bearing system. The number of delivery nozzles utilized may depend upon the overall circumference of the slew bearing system 10 and the total number of bearing rollers used along with other factors. In one embodiment, the delivery nozzles may be positioned where grease fittings were previously used to lubricate a slew bearing system 10. Additional locations for delivery nozzles 70 may be designed into the first bearing ring 20 or second bearing ring 30. Such additional locations may be plugged until needed and may be used as a backup or replacement should a delivery nozzle become damaged.

The exit ports 80 may be capable of outward flow of air and oil from the raceways adjacent the lower raceway of the slew bearing system 10. The exit ports 80 of the slew bearing system 10 may also be capable of maintaining a controlled amount of oil in the slew bearing system. The exit ports 80 may be positioned at multiple locations in the slew bearing system 10. For example, the exit ports 80 may be positioned in the first bearing ring 20 or the second bearing ring 30. In another alternative, the exit ports 80 may be positioned between the first bearing ring 20 and the second bearing ring 30. In one embodiment, the slew bearing system 10 may be designed to collect oil in a sump 81 near the exit port 80. The sump 81 may be formed as part of the slew bearing system between the first bearing ring 20 and the second bearing ring. Alternatively, the sump 81 may be formed between the first bearing ring or the second bearing ring and a sump ring 82 positioned adjacent one of the bearing rings. In one example, the sump ring 82 may be generally L-shaped in cross section, as shown in FIG. 5. In any case, the sump ring 82 may be formed as a single piece or may be formed from one or more mating pieces. The sump 81 may also be capable of maintaining a desired amount of oil within the slew bearing system. In another embodiment, oil may be maintained in an external sump, oil reservoir, or similar external collecting device rather than inside the slew bearing system.

Figure 4:
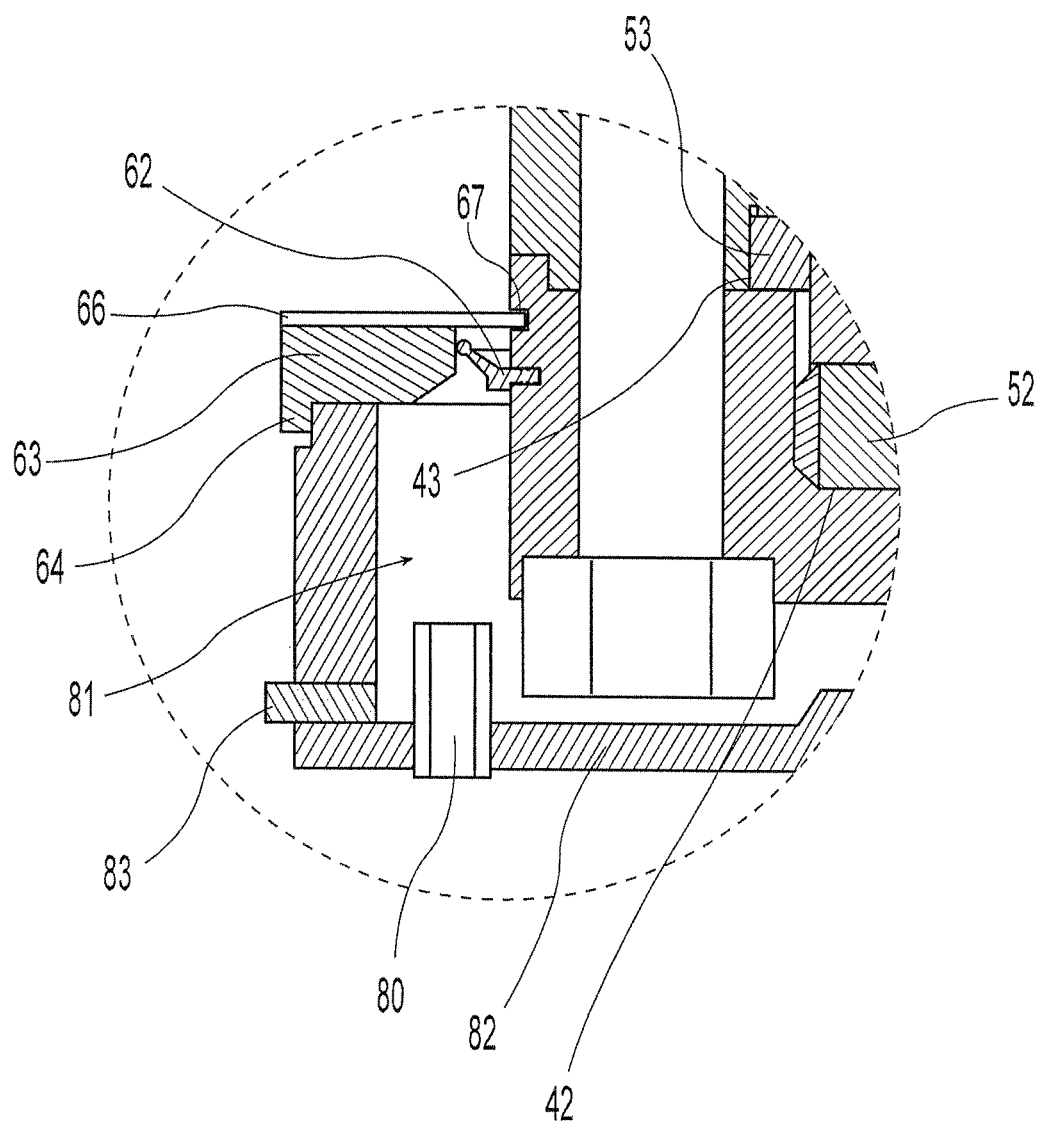
FIG. 4 is a detail view of the slew bearing system of FIG. 3.

Additionally, the exit ports 80 may be adjusted to regulate the amount of oil that will be maintained in the slew bearing system 10. For example, as shown in FIG. 3, the exit port 80 may be a stand pipe adjusted upward in length to maintain more oil in the slew bearing system, or may be adjusted downward in length to maintain less oil in the slew bearing system. The exit ports 80 may also be removable from the slew bearing system to enable oil to be drained from within the slew bearing system. The slew bearing system 10 may also comprise drain plugs 83 capable of outflow of oil from the passages of the slew bearing system. The drain plugs 83 may be removed to drain oil from the slew bearing system 10. Additionally, the drain plugs 83 may be capable of magnetically capturing metal particles from the oil. A magnetic drain plug may improve the reliability of the slew bearing system 10 by assisting in removal of contaminants from the slew bearing system that could damage the bearing rollers and raceways. In one example, the exit ports 80 and the drain plugs 83 may be positioned in the sump ring 82, as shown in FIG. 4.

In another embodiment, the slew bearing system 10 may comprise two exit ports 80 positioned adjacent the tilt axis 12 of the slew bearing system. When the slew bearing system 10 is tilted during operation, oil may flow within the slew bearing system to the lowest point. By positioning exit ports 80 adjacent the tilt axis 12 of the slew bearing system 10, the oil level at the exit port may be maintained when the slew bearing system 10 is tilted, and the possibility of oil exiting the slew bearing system 10 when the slew bearing system is tilted may also be reduced.

The slew bearing system 10 also has seals capable of regulating air flow through the passages and inhibiting outflow of oil from the raceways. As shown in FIG. 5, the slew bearing has an upper seal 61 positioned between the first bearing ring 20 and the second bearing ring. Additionally, the slew bearing system 10 may have an upper seal cover 65 positioned to assist in positioning the upper seal 61. The upper seal cover may increase the pressure on the upper seal to help regulate air pressure within the slew bearing system. As shown in FIG. 6, the upper seal cover 65 may be fastened to the first bearing ring. The upper seal cover may extend over a least a portion of the upper seal. Alternatively, the upper seal cover 65 may be fastened to the second bearing ring. In another alternative, the upper seal cover may also be fastened to the upper seal.

The slew bearing system 10 may also comprise a lower seal 84 positioned adjacent the first bearing ring 20 capable of preventing outflow of air and oil from the passages through the bearing rings. Alternatively, the lower seal 84 may be positioned adjacent the lower raceway. The lower seal may also be positioned between the first bearing ring 20 and a portion of the sump ring 82 to inhibit oil from leaking out of the sump. As shown in FIG. 3, the lower seal may be formed as an O-ring or similar gasket capable of preventing outflow of air and oil. As with the upper seal, a lower seal cover, not shown, may also be employed capable of applying a force to assist in positioning the lower seal.

The slew bearing system 10 may also comprise an air pressure control valve 62 positioned between the second bearing ring and the first bearing ring. Additionally, the slew bearing system 10 may also comprise a seal ring 63 positioned adjacent the second bearing ring. In another alternative, the air pressure control valve 62 may be positioned adjacent the seal ring 63, as shown in FIG. 3. The air pressure control valve 62 may be capable of regulating the air flow through the passages and raceways of the slew bearing system. For example, the air pressure control valve 62 may not separate from the seal ring during normal operation, but may operate as a relief valve when the air pressure within the slew bearing system increases.

The seal ring 63 may be positioned adjacent the second bearing ring with a predetermined gap there between. To facilitate installation and alignment of the seal ring 63, the seal ring may be designed with a seal ring index 64 to ensure the proper positioning of the seal ring relative to the second bearing ring. The predetermined gap between the seal ring 63 and the second bearing ring may be sized so that the air pressure control valve 62 fits securely between the seal ring and the second bearing ring. In one embodiment, the air pressure control valve 62 may be inserted into an aperture in the second bearing ring second portion 32, as shown in FIG. 4. The seal ring 63 may then be installed so that the seal ring 63 in combination with the air pressure control valve 62 may regulate the air pressure within the slew bearing system. In another embodiment, the air pressure control valve may be inserted into an aperture in the seal ring such that when the seal ring is installed the air pressure control valve operates in combination with a surface of the second bearing ring.

Also as shown in FIG. 4, the slew bearing system 10 may comprise an air pressure control valve cover 66. The air pressure control valve cover 66 may be positioned adjacent at least one surface of the second bearing ring and covering at least a portion of the air pressure control valve 62. As shown in FIG. 4, the air pressure control valve cover 66 may be fastened to the seal ring 63 adjacent to the second bearing ring second portion 32 and may also extend over at least a portion of the air pressure control valve 62. To reduce friction during operation of the slew bearing, it may be desired to maintain a gap between the air pressure control valve cover 66 and the second bearing ring. Alternatively, the air pressure control valve cover 66 may be fastened to the second bearing ring, and a gap maintained between the air pressure control valve and the seal ring. In another alternative, the air pressure control valve cover 66 may be fastened to the air pressure control valve 62 and may apply a force to assist in positioning the air pressure control valve.

Over time the seals may wear and need to be replaced. To facilitate replacement, it may be desired for the seals to be separate components. Alternatively, the seals may be an integral part of the first bearing ring 20, the second bearing ring 30, or the sump ring 82. Various materials may be used to form the seals. For example, the seals may be formed from industrial grade polymer material appropriate for use in a high temperature environment. The seal covers may protect the seals from the external environment to reduce the risk of the seals being damaged.

By way of example, the air pressure within the raceways of the slew bearing system 10 may be maintained in the range between 2 and 5 psig. Pressurized air may enter the slew bearing system through the delivery nozzle and the seals and the air pressure control valve may maintain the air pressure within the slew bearing system. The upper seal 61 may be designed to withstand greater pressure than the lower seal 84 and the air pressure control valve 62 so that if a leak should develop the pressurized air and oil may still flow from the upper raceway down through the other raceways to enable continued lubrication of the raceways and bearing rollers.

During operation, pressurized air and oil may be combined. In one embodiment, a measured intermittent delivery of oil may be made into a continuous flow of pressurized air. The amount of oil delivered into the flow of pressured air may be less than the amount of lubricant required with prior systems. The oil and air may be combined through the use of a mixing block, mixing tee, or other similar components known in the prior art. The pressurized air and oil may then pass through hoses or pipes to the delivery nozzles 70 and be delivered into the raceways of the slew bearing system 10.

The pressurized air and oil carries lubricating oil to the raceways and the bearing rollers positioned therein. The pressured air may be increased within the slew bearing system 10 and the increased air pressure within the slew bearing system may be regulated by the seals as previously discussed. This increased air pressure within the slew bearing system 10 may reduce the likelihood of contaminants entering from the surrounding environment into the slew bearing system. Also, the increased air pressure within the slew bearing system 10 may force the oil lubricant into the raceways improving the effectiveness of the lubrication between the raceways and bearing elements. By reducing contamination and improving the lubrication, the slew bearing system 10 is less likely to be damaged or wear and the reliability and operating life may be increased.

The oil exiting the slew bearing system 10 through the exit ports 80 is collected for reuse or disposal. The slew bearing system may also comprise hoses or pipes connected to the exit ports 80 to channel the used oil to a storage container. The used oil may then be discarded or filtered to remove contaminants and reused. The filtered oil may then be redelivered into the slew bearing system 10 through the delivery nozzles 70 as described above. In one embodiment, the pressurized air and oil may be delivered into the slew bearing near the upper raceway 41, as shown in FIGS. 5 and 6. The oil may then be drawn through the concentric raceway 43 and the lower raceway 42 by gravity and pressure drop until the oil reaches the exit port 80. The oil may continuously flow through the raceways by the pressurized air within the slew bearing system. The slew bearing system 10 may be designed to collect oil in the sump 81 near the exit port 80. Alternatively, an oil reservoir or similar container may be provided outside of the slew bearing system 10 to collect used oil.

Also disclosed is an index system having the capability of monitoring wear of a slew bearing system. The index system is a first bearing ring and a second bearing ring, a first reference connected with the first bearing ring and positioned relative to a second reference on the second bearing ring providing a measurable distance between the first reference and the second reference. The measurable distance is capable of changing with wear of the slew bearing system. With use, the raceways, bearing rollers, and other components of the slew bearing system 10 wear resulting in the position of the second bearing ring changing relative to the first bearing ring. As the position of the second bearing ring changes, the measurable distance between the first reference and the second reference changes indicating wear of the slew bearing system. A change in the measurable distance may also indicate a need for maintenance or inspection prior to actual failure of the slew bearing. The index system provides a method of monitoring wear of a slew bearing system by monitoring change in the measurable distance between the first reference and the second reference.

As shown in FIG. 4, the first reference may be an air pressure control valve cover 66 positioned adjacent at least one surface of the second bearing ring. The second reference may be a notch 67 formed in the outer surface of the second bearing ring as shown. As illustrated in FIG. 4, the notch 67 is formed in the outer surface of the second bearing ring second portion 32. In this configuration, the air pressure control valve cover 66 extends into the notch 67, but may not contact the second bearing ring but may form a gap between the air pressure control valve cover 66 and at least one surface of the second bearing ring. The gap is a measurable distance capable of changing with wear of the slew bearing system. In one embodiment, the gap may be approximately 0.030 inches (7.62 millimeters) and may be measurable, for example, with a feeler or clearance gauge capable of small measurements, e.g., down to 0.001 inches. In another embodiment, the measurable distance between the first reference and the second reference may be monitored by an automated system capable of providing an alarm when the change in the measurable distance exceeds a threshold.

Figure 9C:
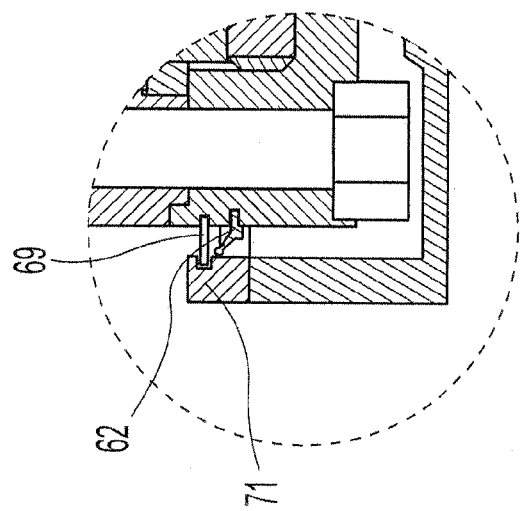
FIG. 9 is a detail view of alternative index systems.
Figure 9B:
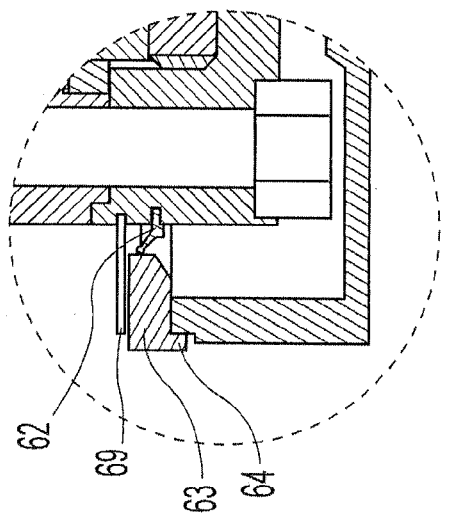
Figure 9A:
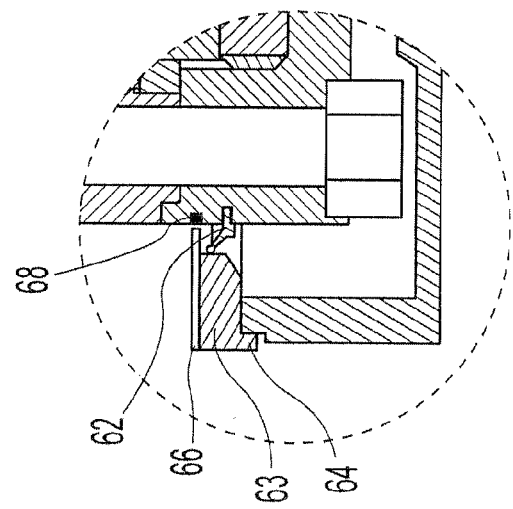

Referring generally to FIG. 9, other configurations of the first reference and the second reference are also contemplated for use with the present disclosure. For example, as shown in FIG. 9A, the first reference may comprise an air pressure control valve cover 66 and the second reference may comprise a reference mark 68 formed on or in the surface of the second bearing ring. In other alternatives, the first reference may comprise a projection or a seal cover attached to the first bearing ring. As shown in FIG. 9B, the first reference may comprise the seal ring 63 while the second reference comprises a projection 69 from the second bearing ring. The projection from the second bearing ring may be a seal cover, an air pressure control valve cover, or another protrusion forming a measurable distance with the first reference. In yet another alternative, the first reference may comprise a notch 71 attached to the first bearing ring. A projection 69 from the second bearing ring may extend into the notch 71 attached to the first bearing ring to form the measurable distance. In yet another alternative, the first reference may comprise the upper seal cover 65, and the second reference may comprise a notch formed on a surface of the second bearing ring first portion 31, as shown in FIG. 6.

In any case, the location of the first reference and the second reference should be selected so that the measurable distance may be reasonably accessible for monitoring and inspection. In each alternative, the measurable distance may change with wear of the slew bearing system, and the change in the measurable distance between the first reference and the second reference may allow monitoring of the wear of the slew bearing system.

The slew bearing system 10 employing pressurized air and oil lubrication has several advantages over oil circulation and grease systems. The amount of oil used is reduced, thereby reducing cost and the risk of fire. Non-flammable oils may be utilized to further reduce the fire risks, but with increased costs. Unlike grease which may only be used once, the oil may be filtered and reused multiple times. Also, the volume of oil used to lubricate a slew bearing system 10 employing pressurized air and oil lubrication may be less than the volume of oil used for circulating oil lubrication, yet be more effective in lubricating the bearing system since oil circulation systems may be deficient in delivering oil to parts of the bearing system at times. By using less oil, leakage of oil from the bearing may also be reduced. The ability to reuse the lubricant and use less oil reduces the total amount of lubricant reducing the operating cost of the system. Also, by reusing the oil, the cost of disposing of used lubricant in compliance with environmental regulations may be reduced. The specific lubricant identified as an air-oil mixture need not be an oil or classified as an oil. The air-oil mixture may be formed from any suitable lubricant capable of being mixed with air or other suitable gas.

The pressurized air may flow continuously through the slew bearing system 10 and oil may be injected only at irregular intervals as required to lubricate the raceways and bearing rollers. In one embodiment, oil may be injected on regular intervals, such as approximately every thirty minutes. In any event, oil generally is delivered more or less frequently depending upon the lubrication requirements of the slew bearing system. The flow, pressure, and volume of the air and oil may also be monitored to provide diagnostic information on the operation and wear of the slew bearing system. Potential failure of the lubrication system may be detected earlier, and therefore maintenance may be performed before the slew bearing system is damaged. The slew bearing system also may operate at a lower temperature as a result. Unlike grease and oil circulation systems, air-oil lubrication does not fill the entire volume of the slew bearing system and therefore friction within the system is reduced. Additionally, the continual flow of air within the slew bearing system may provide cooling to the system. The temperature of the air and oil may also be measured to detect elevated temperatures within the slew bearing system, and assist in monitoring the operation and performance of the bearing system.

The system may filter the air and oil to remove contaminants and particulate matter created within the slew bearing system. Unlike grease lubricants which retain contaminants, the filtered air and oil may be less likely to collect foreign matter that could damage the raceways and bearing rollers. Further, the oil may be completely flushed from the slew bearing system allowing for analysis of any containments to assess the extent of wear within the slew bearing system. By removing contamination from the slew bearing system and improving the ability to inspect the slew bearing, the pressurized air and oil lubrication may enhance the reliability of the slew bearing system and reduce the frequency of unexpected failures.

While the invention has been described with detailed reference to one or more embodiments, the disclosure is to be considered as illustrative and not restrictive. Modifications and alterations will occur to those skilled in the art upon a reading and understanding of this specification. It is intended to include all such modifications and alterations in so far as they come within the scope of the claims, or the equivalents thereof.

What is claimed is:

1. A method of monitoring wear of a slew bearing system comprising:
   (a) assembling a slew bearing system comprising:
      a first bearing ring and a second bearing ring concentrically positioned relative to each other forming at least upper and lower raceways,
      a plurality of bearing rollers positioned in each raceway between the first bearing ring and the second bearing ring, and
      an index system having a first reference connected with the first bearing ring and positioned relative to a second reference on the second bearing ring to provide a measurable distance between the first reference and the second reference, where the measurable distance changes with wear of the slew bearing system, wherein the second reference is formed in, formed on, or projects from an outer surface of the second bearing ring such that the location of the measureable distance for monitoring wear is accessible from outside the first bearing ring and the second bearing ring; and
   (b) monitoring a change in the measurable distance between the first reference and the second reference to monitor wear of the slew bearing system.

2. The method of monitoring wear of a slew bearing system of claim 1 where the second reference comprises a notch formed in the outer surface of the second bearing ring.

3. The method of monitoring wear of a slew bearing system of claim 1 where the second reference comprises a projection from the second bearing ring.

4. The method of monitoring wear of a slew bearing system of claim 1 where the second reference comprises a reference mark formed on the surface of the second bearing ring.

5. The method of monitoring wear of a slew bearing system of claim 1 where the first reference comprises an air pressure control valve cover positioned adjacent at least one surface of the second bearing ring.

6. The method of monitoring wear of a slew bearing system of claim 1, the step of monitoring a change in the measurable distance comprising using a spark plug gap gauge to measure the measurable distance between the first reference and the second reference.

7. A slew bearing system with an index system having the capability of monitoring wear of the slew bearing system comprising:
(a) a first bearing ring and a second bearing ring concentrically positioned relative to each other forming at least upper and lower raceways,
(b) a plurality of bearing rollers positioned in each raceway between the first bearing ring and the second bearing ring, and
(c) a first reference connected with the first bearing ring and positioned relative to a second reference on the second bearing ring providing a measurable distance between the first reference and the second reference, where the measurable distance is capable of changing with wear of the slew bearing system, wherein the second reference is formed in, formed on, or projects from the second bearing ring such that the location of the measurable distance for monitoring wear is accessible from outside the first bearing ring and the second bearing ring.

8. The slew bearing system of claim 7 where the first reference comprises a projection attached to the first bearing ring.

9. The slew bearing system of claim 7 where the first reference comprises a seal cover attached to the first bearing ring.

10. The slew bearing system of claim 7 where the first reference comprises an air pressure control valve cover positioned adjacent at least one surface of the second bearing ring.

11. The slew bearing system of claim 7 where the first reference comprises a notch attached to the first bearing ring.

12. The slew bearing system of claim 7 where the second reference comprises a notch formed in the outer surface of the second bearing ring.

13. The slew bearing system of claim 7 where the second reference comprises a projection from the second bearing ring.

14. The slew bearing system of claim 7 where the second reference comprises a reference mark formed on the surface of the second bearing ring.

15. A method of monitoring wear of a slew bearing system, comprising:
monitoring a change in the measurable distance between a first reference related to a first bearing ring and a second reference related to a second bearing ring to monitor wear of the slew bearing system;
wherein the first reference is formed in, formed on, or projects from an outer surface of the second bearing ring;
wherein the second reference is formed in, formed on, or projects from an outer surface of the second bearing ring; and
wherein the measureable distance for monitoring wear is accessible from outside the first bearing ring and the second bearing ring.

16. The method of claim 15, wherein the first reference or the second reference is a reference mark, a notch, or a projection.

17. The method of claim 15, wherein the first reference or the second reference is a seal cover, air pressure control valve cover, or seal ring.

18. An index system for a slew bearing system, comprising:
a first reference formed in, formed on, or projecting from a first bearing ring;
a second reference formed in, formed on, or projecting from a second bearing ring;
wherein a measureable distance is created between the first reference and the second reference for monitoring wear; and
wherein the measureable distance is accessible from outside of the first bearing ring and the second bearing ring.

19. The index system of claim 18, wherein the first reference or the second reference is a reference mark, a notch, or a projection.

20. The index system of claim 18, wherein the first reference or the second reference is a seal cover, air pressure control valve cover, or seal ring.

* * * * *